United States Patent Office 3,416,966
Patented Dec. 17, 1968

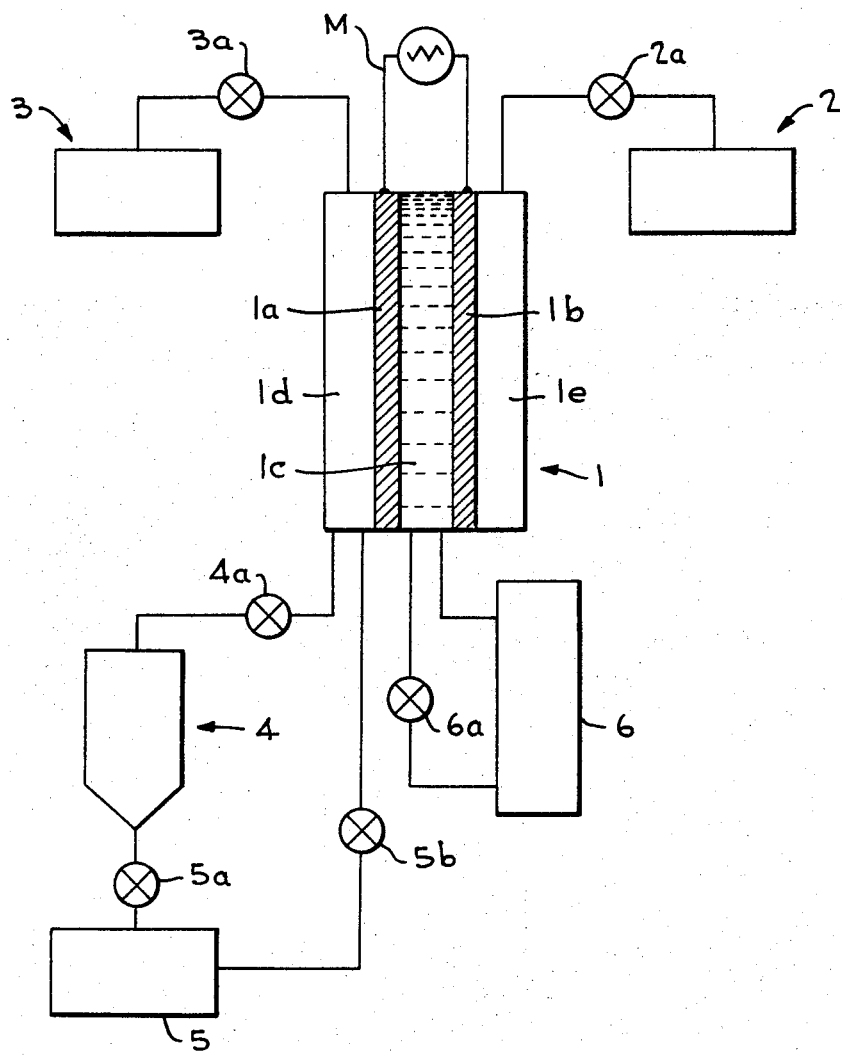

3,416,966
POWER SYSTEM FUNCTIONING ALTERNATELY FOR PRODUCING OR CONSUMING ELECTRICAL ENERGY
Harry G. Oswin, Chauncey, N.Y., assignor to Leesona Corporation, Warwick, R.I., a corporation of Massachusetts
Filed Nov. 9, 1964, Ser. No. 409,783
4 Claims. (Cl. 136—86)

ABSTRACT OF THE DISCLOSURE

A power system capable of even operation throughout periods of peak and low consumption is described. The power system comprises a primary power source for producing electrical energy and a secondary unit for selectively producing electrical energy and consuming electrical energy and means for electrically connecting and placing the primary power source and secondary unit in operable association. The secondary unit comprises an electrochemical device comprising an anode, a cathode, and an electrolyte spaced therebetween. The anode is capable of consuming hydrogen when placed on load and capable of producing hydrogen when electrical current is applied thereto. Accordingly, during operation of the power system at peak loads, the secondary unit is utilized to produce electrical energy by consuming hydrogen from a hydrogen-rich material which supplements the electrical output of the primary power source. The hydrogen-depleted material is recovered and stored. In periods of low consumption, the secondary unit is selectively operated to withdraw current from the primary power source with the withdrawn current being utilized to electrolytically produce hydrogen which is absorbed by the hydrogen-depleted material to form a hydrogen-rich material which is again utilized as the fuel of the electrochemical cell during periods of peak loads.

---

This invention relates to a regenerative power source and more particularly it comprises a rechargeable fuel cell unit. In a preferred embodiment, the invention embraces a fuel cell unit for supplementing a primary power supply during periods of high consumption and for storage of excess power in periods of low consumption.

In the prior art, the need has been recognized for electrical generating devices capable of storing energy during periods of low consumption for use in supplementing a power source in periods of peak consumption. Such devices eliminate the need for excessively large generators, which necessarily must run at less than full capacity at periods of low consumption, or for auxiliary generators for use during peak periods, which will remain idle during periods of low consumption. However, all of the suggested devices have one or more serious shortcomings. Thus, the use of rechargeable systems based on secondary batteries, while solving the problem for some applications, are limited in use in that the energy/density of suitable units is relatively low. A second type of device which has received considerable interest is one which can store energy in the form of chemicals and release the power in the form of electrical energy as a result of the electrochemical oxidation of the chemical fuel. Examples of suggested systems are hydrogen/oxygen, hydrazine/oxygen, and methanol/oxygen cells. However, each of the above systems has its own peculiar disadvantage. In the case of methanol and hydrozine, disposing of the waste products (carbon dioxide and nitrogen) from the stream without discarding considerable quantities of unburnt fuel presents serious problems. Hydrogen/oxygen cells, while being highly efficient and compact, suffer from a serious disadvantage in that storage of hydrogen as a compressed gas or in liquified form is extremely undesirable.

Accordingly, it is an object of the present invention to provide a unit for supplementing a primary electrical power source during periods of peak consumption which can store energy during periods of low consumption.

It is another object of this invention to provide a unit which permits storage of hydrogen in a readily regenerable form and eliminates the need for cryogenic storage units.

It is another object of this invention to provide a rechargeable fuel cell unit, which unit utilizes the waste heat of the fuel cell reaction by vaporizing and decomposing a liquid fuel.

It is another object of this invention to provide a rechargeable fuel cell unit employing cyclohexane as the fuel and comprising hydrogen diffusion anodes which are particularly adapted to function as a dehydrogenation catalyst for cyclohexane.

It is another object of this invention to provide a rechargeable fuel cell unit in which the regeneration of benzene to cyclohexane can be carried out in the unit by applying current in the direction reverse to that in which it is generated when using the deviceas a fuel cell.

These and other objects of the present invention will become apparent to one skilled in the art form the detailed description set forth hereinafter, with particular emphasis being directed to the drawing and example.

The objects of this invention are accomplished with a unit comprising a fuel cell in combination with a supply of hydrogen-rich material, a condenser, and a storage unit for the hydrogen-depleted material. According to a preferred embodiment, in operation at periods of peak utilization of electrical energy, the hydrogen-rich material is fed to the anode where hydrogen is split off and consumed by the cell with the hydrogen-poor material being condensed and stored in a storage container. In periods of low consumption of electrical energy, the process is reversed, whereby electrical current is supplied to the cell with the hydrogen-poor material being circulated to the anode of the fuel cell (the cathode of the electrolysis unit) where hydrogen is electrochemically produced and adsorbed by the hydrogen-poor material. After the adsorption, the now hydrogen-rich material is pumped to a storage unit for utilization in another peak period.

Alternatively, the hydrogen-rich material can be regenerated by chemical means, either employing the heat of the fuel cell in the reaction or not as conditions demand. For example, hydrogen can be manufactured by reforming natural gas. The hydrogen produced by such means is brought into contact with the hydrogen-poor material, regenerating the hydrogen-rich material.

A diagrammatic illustration of a suitable unit is shown in the drawing. In the drawing, fuel cell 1 comprises anode 1a, cathode 1b, electrolyte 1c, fuel compartment 1d, and oxidant compartment 1e. Oxidant is fed to the cathode from an oxidant source 2 through valve or pump means 2a. Particularly in the event air is used as the oxidant, it may be necessary to provide suitable vent means, not shown. When the unit is employed to supplement a primary power source during periods of peak demand, a hydrogen-rich material is fed from storage unit 3 through valve or pump means 3a to the anode of the cell. While the heat of the fuel cell reaction is preferably utilized in vaporizing and decomposing the hydrogen-rich material for consumption in the cell, it may be desirable to employ an auxiliary heater, not shown, at least until the complete unit is raised to operating temperature. Such heaters can be the conventional coil heaters, or may comprise nuclear reactors, or solar reflectors. After the hydrogen is removed from the hydrogen-rich reactant, the depleted material is passed to storage units 5 through valves or pumps 4a and 5a and condenser 4. Current is taken off or provided.

Preferably, during periods of low consumption, the fuel cell is operated in reverse as an electrolytic cell to produce hydrogen, with the hydrogen depleted material being passed in contact with the cathode of the electrolytic cell (anode of the fuel cell) where the hydrogen is produced in order that the hydrogen is adsorbed, again producing a hydrogen-rich material. The hydrogen-rich material is pumped to container 3 where it is stored for future use. In such instances, an electrolytic solution can be circulated from storage container 6 through pump or valve means 6a. Alternatively, as noted hereinbefore, in the event it is undesirable to employ the fuel cell as an electrolytic cell, the hydrogen-depleted material can be pumped from container 5 and reacted chemically to again produce a hydrogen-rich material for later use. This alternative falls within the scope of the present invention.

The hydrogen-rich materials for use in this invention include any of the hydrogen-carbon containing compounds which can be dissociated into hydrogen gas and a secondary component, preferably by mere application of heat, and with the reaction being reversible. However, in view of their favorable equilibrium conditions and availability, cyclohexane, decahydronaphthalene, methylcyclohexane, and dimethylcyclohexane are preferred. These materials are converted into benzene, naphthalene, toluene, and xylene respectively. Other materials which can be employed include the saturated hydrocarbons which are converted to the unsaturated materials by the application of heat alone, or in the presence of a catalyst. Suitable materials include propane, butane, pentane, and the like.

The fuel cells which are employed in the present system are those known in the art. Thus, operable cells employ anodes which are of the non-porous hydrogen diffusion type disclosed in Oswin, U.S. Patent No. 3,092,517, or porous anodes such as those disclosed in Bacon, U.S. Patent No. 2,716,670. Preferably, however, the fuel cell will comprise non-porous hydrogen diffusion anodes, such as the palladium alloy membranes. In such instances, the surface fronting the reactant material can be coated, if desired, with a catalyst which will enhance the dehydrogenation of the hydrogen-rich material and also function as a catalyst for the electrochemical reaction. Moreover, since the membranes selectively diffuse hydrogen, there is no possibility of the second component of the reaction flooding the electrode and/or diluting the electrolyte. Since the hydrogen is removed from the reaction site substantially as it is formed, the equilibrium of the reaction is shifted in favor of the dehydrogenation.

In order to obtain the greatest reaction efficiencies at the lowest possible temperature, it is desirable to have a catalyst in contact with the anode to accelerate the dehydrogenation of the hydrogen-rich material. Depending upon the hydrogen-rich material employed, one particular catalyst may be more advantageous than another. In general, however, elemental materials containing the elemental materials are operable. Mixtures of zinc, copper, and chromium with minor traces of iron are highly efficient. Other catalysts such as nickel, cobalt, iron, and ruthenium when used either individually or in combination can be selected. Additionally, catalyst such as palladium and platinum black adjacent to the anode structure are highly effective.

The catalyst preferably is maintained in intimate contact with the anode or as closely adjacent thereto as possible. If the catalyst is spaced a substantial distance from the anode, the availability of the hydrogen to the anode, and the heat transfer between the catalyst and the fuel cell reactant will be less efficient. Provided this is the case, the equilibrium conditions favoring the production of additional hydrogen will also be decreased. Although the thickness of the catalytic layer is not critical, normally the layer will be from about 2 to 100 mils thick when maintained adjacent to, or in contact with the anode. As is apparent, the thinner the layer, the more efficient will be the hydrogen extraction and transference of heat generated by the fuel cell reaction to the dehydrogenation site. Moreover, in accordance with the invention, in addition to the dehydrogenation being carried out in situ, within the fuel cell, the reaction can be carried out in a reactor outside of the fuel cell and the gaseous hydrogen fed to the fuel cell anode.

The presently described fuel cell units are operable within a fairly wide temperature range. As would be predicted, the temperature to a large extent depends upon the hydrogen-rich material which is to be used in the reaction and the nature of the fuel cell. Thus, in the event cyclohexane is employed, dehydrogenation will readily occur at temperatures of from about 170 to 300° C., at substantially atmospheric pressure. At such temperatures, the fuel cells disclosed by Oswin, U.S. Patent. No. 3,092,517, are highly efficient. As a general rule, therefore, it can be said that the fuel cell system will be operated at temperatures in excess of about 75° C., and preferably not over about 450° C. A particularly desirable feature of the system, as noted hereinbefore, is that there is a substantially complete utility of the waste heat of the fuel cell reaction by the dehydrogenation reaction, thereby solving a particularly troublesome problem encountered in the construction of an efficient fuel cell.

The cells of the present invention can be operated with a variety of electrolytes including aqueous alkalies such as potassium hydroxide and sodium hydroxide. Acid electrolytes which can be employed include sulfuric and phosphoric acids. It is necessary that the electrolyte employed be capable of producing hydrogen by electrolytic means, provided the hydrogen-depleted material is to be reconverted into a hydrogen-rich material during periods of low consumption by electrical means. On the other hand, if the hydrogen-depleted material is to be restored to a hydrogen-rich material by chemical means, the selection of the electrolyte is not nearly as critical.

Having described the invention in general terms, the following example is being set forth to more particularly illustrate the invention.

EXAMPLE

A regenerative fuel cell system is constructed substantially as illustrated in the drawing. The fuel cell utilized comprises a 75-percent palladium, 25-percent silver alloy non-porous, hydrogen diffusion membrane anode having a thickness of 0.0015 inch. The membrane is activated on both major surfaces with palladium black. The palladium black was applied from a 2-percent palladium chloride bath after the membrane had been pre-exposed to hydrogen gas. A dehydrogenation catalyst composed of nickel/ alumina is applied to the gas side of the anode. The catalyst layer is approximately 1/32 of an inch in thickness. The cathode of the cell is a bi-porous nickel electrode activated with cobalt-nickel oxide. The cathode activation is carried out by impregnating the structure with a solution of cobalt and nickel nitrates, employing a 7:3 cobalt to nickel ratio containing 10 percent by weight metal, drying and oxidizing the structure at 500° C., in air. The preparation of such electrodes is described more completely in Lieb et al., co-pending application Ser. No. 165,212, now abandoned, filed Jan. 9, 1962. The electrolyte of the cell is an 85 percent by weight aqueous potassium hydroxide solution. The operating temperature of the cell is 250° C. The anode is fed with a stream of cyclohexane which has been pre-vaporized prior to entering the fuel cell by an auxiliary heater. Oxygen is fed to the cathode at a pressure of 10 p.s.i.g. Current density versus cell potential data are as follows:

| Current density (ma./cm.²) | Cell potential (volts) |
|---|---|
| 0 | 1.138 |
| 10 | 1.11 |
| 50 | 1.00 |
| 110 | 0.84 |

Benzene is collected in the storage unit 5 after being condensed in condenser 4.

The unit described is reversible, i.e., the fuel cell can be utilized as an electrolytic cell to again produce the hydrogen-rich material by passing the benzene adjacent to the anode (cathode of the electrolytic cell) while hydrogen is being produced electrolytically. Alternatively, the benzene collected can be converted to cyclohexane externally by its being reacted with hydrogen gas obtained by reforming natural gas to hydrogen and carbon dioxide.

As is apparent from the above example, the presently defined unit provides a highly efficient and convenient rechargeable fuel cell system. The cell can be operated at low temperatures utilizing, to a substantial extent, the waste heat of the fuel cell reaction. The unit has excellent potential for use as a secondary electricity supply unit where there is a high fluctuation in the electrical energy requirements.

While various modifications of the invention are disclosed, it should be appreciated that the invention is not to be restricted thereto. Other embodiments will be apparent to one skilled in the art which come within the scope and spirit of the invention and the appended claims.

It is claimed:

1. A power system capable of even operation throughout periods of peak and low consumption comprising in combination: a primary power source for producing electrical energy and a secondary unit for selectively producing electrical energy and consuming electrical energy and means constructed and arranged with said primary power source and secondary unit for electrically connecting said primary power source and said secondary unit including means for selectively feeding electrical power to said secondary unit from said primary power source or withdrawing electrical power from said secondary unit and feeding said withdrawn power to said power system to supplement the power of said primary power source, said secondary unit comprising an electrochemical cell comprising a first chamber including a first electrode, a second chamber including a second electrode, and an electrolyte between said electrodes, said first electrode being capable of consuming hydrogen from a hydrogen containing material when a load is applied to said electrochemical device and producing hydrogen when electrical current is applied thereto; a first storage unit for storage of a hydrogen-rich material; a second storage unit for storage of a hydrogen-depleted material; and means for selectively passing said hydrogen-rich material to said first chamber of said electrochemical cell in one direction from said first storage unit, and means to supply said hydrogen-depleted material to said first chamber of said electrochemical cell from said second storage unit in a direction opposite to the passing of said hydrogen-rich material; components of said secondary unit; said primary power source and said means of said power system being constructed and arranged for feeding said hydrogen-rich material to said electrochemical cell and consumed therein producing electrical current and supplying said current to said power system during periods of peak consumption, and electrical power being withdrawn from said power system during periods of low consumption and fed to said eelctrochemical cell of said secondary unit to electrolytically produce hydrogen, said hydrogen-depleted material being simultaneously passed to said electrochemical cell, and said hydrogen electrolytically produced being adsorbed by said hydrogen-depleted material to form a hydrogen-rich material.

2. The power system of claim 1 wherein the anode of the electrochemical cell is a non-porous hydrogen diffusion membrane.

3. The power system of claim 2 wherein a dehydrogenation catalyst is in intimate contact with said non-poroun hydrogen diffusion membrane.

4. The power system of claim 3 wherein the non-porous hydrogen diffusion membrane is a palladium silver alloy.

References Cited

UNITED STATES PATENTS

| | | | |
|---|---|---|---|
| 2,749,293 | 6/1956 | Wahlin | 204—73 |
| 2,969,315 | 1/1961 | Bacon | 136—86 |
| 3,092,517 | 6/1963 | Oswin | 136—86 |
| 3,183,278 | 5/1965 | Koch | 260—667 |
| 3,280,014 | 10/1966 | Kordesch et al. | 204—73 |

WINSTON A. DOUGLAS, *Primary Examiner.*

H. FEELEY, *Assistant Examiner.*